Patented Jan. 23, 1945

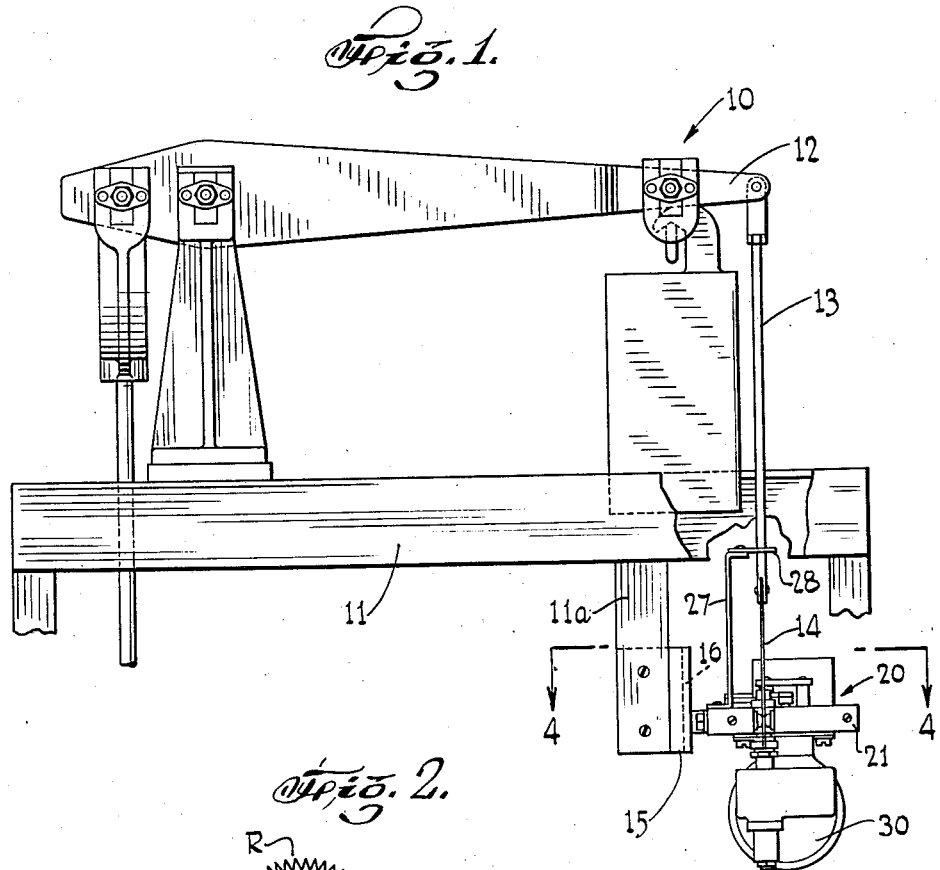

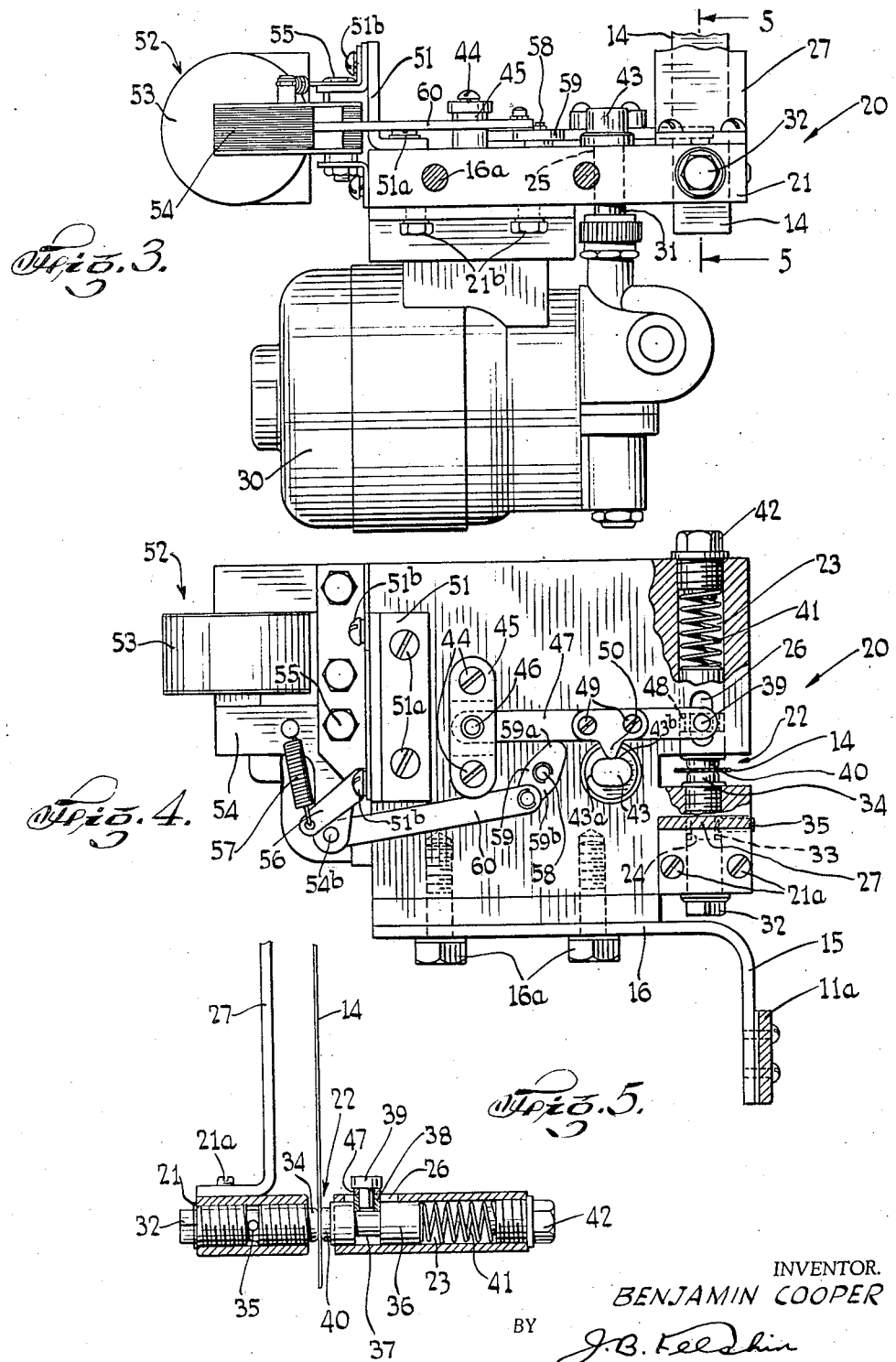

2,368,002

UNITED STATES PATENT OFFICE 2,368,002

DAMPING DEVICE

Benjamin Cooper, Netcong, N. J.

Application March 13, 1942, Serial No. 434,533

5 Claims. (Cl. 188—67)

This invention relates to damping devices. It is particularly directed to devices for damping the movement of the beam of a weighing scale, or the like devices.

An object of this invention is to provide a damping device of the character described, having means to dampen or retard movement of a movable member by a fingering action, or intermittent grip and release of said member.

A further object of this invention is to provide in a damping device of the character described, means to regulate the gripping and releasing periods of the movable member.

Another object of this invention is to provide in a damping device of the character described, means to render the damping device inoperative to permit free movement of said movable member.

Still a further object of this invention is to provide a highly improved, compact, and rugged damper device of the character described, which shall be easy to operate, relatively inexpensive to manufacture, smooth and positive in action, which shall have a large variety of applications, and yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which one of the various possible illustrative embodiments of this invention is shown, Fig. 1 is a front elevational view showing the damping device, embodying the invention, fixed to a beam scale;

Fig. 2 is a wiring diagram for the motor of the damping device;

Fig. 3 is a side view of a damping device, embodying the invention;

Fig. 4 is a plan cross-sectional view taken on line 4—4 of Fig. 1; and

Fig. 5 is a cross-sectional view taken along line 5—5 of Fig. 3.

Referring now in detail to the drawings, there is shown for the purpose of illustration, a scale beam 10, mounted on a support 11 (such as shown, described and claimed in my co-pending application for United States Letters Patent on Automatic weighing scales, filed March 13, 1942, Serial No. 434,532). Fixed to beam 10, in any suitable manner, is an extended arm 12. Pivoted to the end of said arm is a depending rod 13 having fixed at its lower end, a vertical damper vane or strip 14.

Fixed to support 11 is a depending standard 11a. Attached to said standard is a vertical right angular member 15, having an arm 16. Fixed to arm 16, as by bolts 16a, is a damping mechanism 20, embodying the invention. The same comprises a horizontal platform 21, formed with an elongated notch 22 at one end, in alignment with the strip 14, and through which said strip passes. Said platform also has coaxial openings 23 and 24 on opposite sides of said notch, the latter opening being screw threaded and of less diameter than the former opening. The outer end of opening 23 is also threaded internally. Platform 21 is further formed with a vertical opening 25, aligned with notch 22 and spaced therefrom. Said platform also has an elongated, vertical opening 26, adjacent and perpendicular to notch 22 and extending from opening 23 to the top surface of the platform.

Fixed to the upper surface of platform 21, as by screws 21a, is a vertical angle member 27 carrying at its upper end an adjustable forked horizontal guide 28, through which passes rod 13 (Fig. 1).

Threaded within opening 24 is a bolt 32, formed with a peripheral slot 33, mediately the ends thereof. Attached to the end of bolt 32, adjacent slot 22, is a bumper button 34, parallel with the face of damper strip 14 and projecting into slot 22. Threaded in the edge of platform 21, and perpendicular to the bolt 32 is a set screw 35, registering with slot 33. Thus bolt 32 may be adjusted so that bumper surface of button 34 lightly engages damper strip 14, and then held in place by tightening the set screw 35.

Slidably mounted in opening 23 is a shuttle 36, formed with a peripheral slot 37, and provided with a bumper button 40, parallel to the opposite face of damper strip 14. Fitted in slot 37 is a bearing 38 extending upwardly through slot 26 (Fig. 5). Pivoted within said bearing is a capped pin 39. Within opening 23, and abutting the end of shuttle 36 is a coil compression spring 41 held in place by screw 42 threaded into the screw threaded end of said opening.

Means is provided to reciprocate shuttle 36 so that bumper button 40 will intermittently engage damper strip 14, pressing the same repeatedly against bumper 34 to dampen, retard or snub the oscillations of the scale beam 10. To this end, there is fixed to the underside of platform 21, as by screws 21b, an electric motor 30, having a vertical drive shaft 31 passing through the opening 25.

Mounted on the vertical shaft 31 of motor 30, is a cam 43 formed with high portions 43a and low portions 43b (Figs. 3 and 4). Fixed to the top of platform 21, as by screws 44, is a bracket 45, provided with a pin 46. Pivotally mounted on said pin is a vibratory lever 47 having a slot 48 at its free end to secure pin 39. Fixed to the central portion of lever 47, as by screws 49, is a cam follower 50, held in engagement with the periphery of cam 43 by action of compression spring 41 on shuttle 36.

By operating motor 30, in the manner hereinafter described, shaft 31 will be rotated, rotating cam 43. By rotating cam 43, cam follower 50 will be raised as it rides over a high portion 43a of said cam, and lowered as said cam follower engages a low part 43b (Fig. 4). Arm 47 will thus be oscillated, reciprocating or vibrating the shuttle 36 through pin 39 and bearing 38. Bumper 40 will alternately engage and release the damper strip 14, holding said strip momentarily at repeated intervals against upward or downward movement, and also disengaging said strip, at repeated intervals. Thus, the oscillation of scale beam 10 is dampened, bringing said beam to balanced position.

Means is provided to operate the motor 30 at varying speeds to increase or decrease the intervals of time during which the damper strip 14 is snubbed between bumpers 34 and 40.

To this end, there is provided a circuit C (Fig. 2), for motor 30. Said motor comprises armature 30b connected in series with field 30a. The armature is connected by wire 63 to one lead of a power supply E. The field 30a is connected by wires 62, 66 to the other lead of the power supply E. Between wires 62, 66 is a rheostat R having an adjustable arm 61. Across power supply E is a double pole, single throw switch 64. It will now be understood that motor 30 is energized by closing switch 64. The speed of said motor may be adjusted by manipulating arm 61 of rheostat R.

Means is further provided to hold bumper 40 disengaged from damper strip 14, when scale beam 10 is almost at its balance point, to permit free oscillation of beam 10.

To this end, there is fixed to the upper surface of platform 21, as by screws 51a, an angle member 51, perpendicular to said platform. Fixed to said member, as by screws 51b, is a solenoid 52, having a coil 53, and an armature 54, pivoted as at 55. Fixed to member 51, as by a screw 51b, is an extending arm 56. The armature 54 is connected to arm 56 by tension spring 57 adapted to rotate the armature about its pivot when the coil of the relay is deenergized. Spring 57 tends to rotate armature 54 in a counterclockwise direction about its pivot 55 (Fig. 4) member 51, acting as a stop to limit its rotation.

Fixed to platform 21 is a pivot pin 58, having pivoted thereon a lever 59 provided with arms 59a, 59b. Arm 59b is connected by a link 60 to armature 54, as at 54b. Arm 59a is adapted to engage lever 47 upon counterclockwise rotation of lever 59 about its pivot 58 (Fig. 4).

When solenoid 52 is energized, armature 54 rotates against the action of spring 57, and assumes the position as shown in Fig. 4. Link 60 is thus moved to the left, rotating lever 59 in a clockwise direction, freeing lever 47. Upon deenergization of the solenoid, armature 54 is rotated counterclockwise about pivot 55 by spring 57 (Fig. 4) moving link 60 to the right to rotate lever 59 in a counterclockwise direction. Arm 59a will engage lever 47, rotating said lever in a counterclockwise direction, lifting cam follower 50 against the action of spring 41, from the periphery of cam 43. Thus damper strip 14 is freed of bumpers 34 and 40 and is free to oscillate in slot 22 of the platform 21.

Means is provided to energize solenoid 52 simultaneously with energization of motor 30, upon closing switch 64. To this end, the coil 53 of solenoid 52 is connected by wires 65, 67 in parallel across the motor and rheostat as illustrated in Fig. 2. When switch 64 is closed, solenoid 53 is energized, the circuit being from one pole of said switch through wire 65, coil 53, and wires 67 and 63, to the other pole of said switch. Armature 54 of said solenoid is rotated in a clockwise direction, Fig. 4, to move link 60 and lever 58, to free lever 47 in the manner heretofore described. Motor 30 is also operated at the same time, the motor circuit being from one pole of switch 64 through wires 65 and 66, rheostat arm 61, the rheostat R, wire 62, field coils 30a, armature 30b, wire 63 to the other pole of said switch. By varying the resistance of rheostat R, more or less current flows through motor 30, thus increasing or decreasing its speed. Cam 43 is thus able to rotate at varying speeds to increase or decrease the snubbing action of bumper 40 on vane 14 and bumper 34.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter hereinbefore set forth or shown in the accompanying drawings is to be interpreted as illustrative and not in a limiting sense.

Having thus described my invention, I claim as new and desire to secure by Letters Patent:

1. In combination, a movable member, a stationary member on one side of said movable member, and adjacent thereto, a reciprocating member on the other side of said movable member and in alignment with said stationary member, means for reciprocating said reciprocating member to alternately press said movable member against said stationary member and release said movable member, and means independent of said reciprocating means to hold said reciprocating member away from said movable member to permit free movement thereof.

2. A device for dampening movement of a movable member, comprising a stationary member, a reciprocating member aligned therewith, a pivoted lever connected to said reciprocating member, a motor, a shaft driven thereby, a cam on said shaft adapted to engage said lever, and spring means to move said reciprocating member toward said stationary member.

3. A device for dampening movement of a movable member, comprising a stationary member, a reciprocating member aligned therewith, a pivoted lever connected to said reciprocating member, a motor, a shaft driven thereby, a cam on said shaft adapted to engage said lever, spring means to move said reciprocating member toward said stationary member, and means to lift said lever away from said cam against said spring means.

4. Mechanism to dampen the movement of a movable member, including a member adapted to engage said movable member, vibratory means to move said engaging member at regular consecutive periods relative to said movable member, means to retain said vibratory means in a position to keep the engaging member out of engagement with respect to said movable member, and means independent of said retaining means to operate said vibratory means.

5. Mechanism to dampen the movement of a movable member, including a member adapted to engage said movable member, actuating means to periodically move said engaging member relative to said movable member, means to retain said actuating member in a position to keep the engaging member out of engagement with respect to said movable member, means independent of said retaining means to operate said actuating means, and means to vary the speed of operation of said operating means.

BENJAMIN COOPER.